No. 740,723. PATENTED OCT. 6, 1903.
M. J. WHEELER.
COOKING UTENSIL.
APPLICATION FILED JUNE 27, 1902.
NO MODEL.
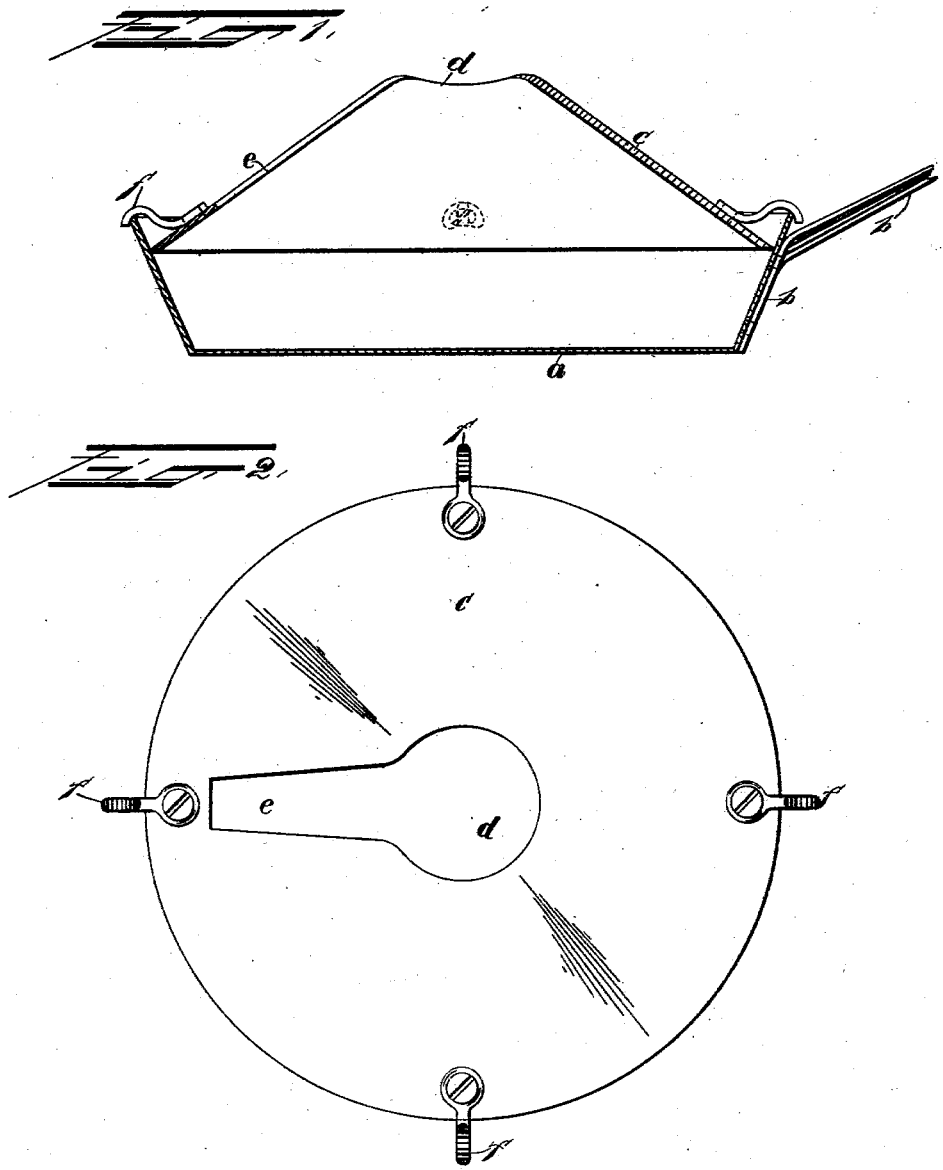
WITNESSES
INVENTOR
Mary Jane Wheeler.
BY
ATTORNEYS No. 740,723. Patented October 6, 1903.

UNITED STATES PATENT OFFICE.

MARY JANE WHEELER, OF BOURNEMOUTH, ENGLAND.

COOKING UTENSIL.

SPECIFICATION forming part of Letters Patent No. 740,723, dated October 6, 1903.

Application filed June 27, 1902. Serial No. 113,386. (No model.)

*To all whom it may concern:*

Be it known that I, MARY JANE WHEELER, a subject of the King of Great Britain, residing at Bournemouth, in the county of Hants, England, have invented certain new and useful Improvements in Cooking Utensils, of which the following is a full and complete specification, such as will enable those skilled in the art to which it appertains to make and use the same.

The object of this invention is to provide a shield for a frying-pan or similar cooking utensil which will prevent grease or other liquids from spattering out onto the stove, thereby causing an unpleasant odor, besides injuring and defacing the stove, a further object being to provide a cooking utensil of the class described with a shield having an opening whereby the material being fried or cooked may be turned without removing the shield.

The invention is fully disclosed in the following specification, of which the accompanying drawings form a part, in which—

Figure 1 is a central transverse section of a frying-pan provided with my improved shield, and Fig. 2 a plan view of the shield.

In the drawings forming part of this specification I have shown at *a* an ordinary frying-pan provided with a handle *b*, and in the practice of my invention I provide a shield *c*, which is perfectly conical or dome-shaped in form and provided with a central top opening *d*, having a radial extension *e*, which extends partially through one side of the shield, and by means of the opening *d* and the extension *e* thereof meat or other food in the operation of being fried in the pan *a* may be turned or stirred without removing the shield *c*.

The base of the shield *c* is of such diameter as to fit within the top of the frying-pan and to pass downwardly a predetermined distance therein, and the shield *c* is also provided around its perimeter with a plurality of hooks or supports *f*, which rest on the top of the pan and hold the shield in proper position. As thus made the shield *c* will be held in proper position at all times by its supports and will turn or tilt and will prevent grease or other liquids from spattering out of the pan and will also permit of all necessary attention being given to the article or articles which are being cooked in the pan.

Having fully described my invention, what I claim as new, and desire to secure by Letters Patent, is—

A shield for a frying-pan, said shield being dome-shaped in form and provided with a central opening having a radial extension which opens outwardly through one side thereof, the base of the shield being of less diameter than the frying-pan and adapted to fit within the top thereof, and hooks secured to the top of the shield around the base portion thereof and projecting outwardly and adapted to rest on the top edge of the frying-pan, substantially as shown and described.

In testimony that I claim the foregoing as my invention I have signed my name, in presence of the subscribing witnesses, this 7th day of June, 1902.

MARY JANE WHEELER.

Witnesses:
ERKINWALD BRAXTON MOORING ALDRIDGE,
JOHN ALFRED INNES DUFF.